(12) United States Patent
Zheng et al.

(10) Patent No.: US 12,317,112 B2
(45) Date of Patent: May 27, 2025

(54) MEASUREMENT METHOD, MEASUREMENT CONFIGURATION METHOD, TERMINAL AND NETWORK DEVICE

(71) Applicant: VIVO MOBILE COMMUNICATION CO., LTD., Guangdong (CN)

(72) Inventors: Qian Zheng, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 350 days.

(21) Appl. No.: 17/492,715

(22) Filed: Oct. 4, 2021

(65) Prior Publication Data
US 2022/0030457 A1   Jan. 27, 2022

Related U.S. Application Data

(63) Continuation of application No. PCT/CN2020/083964, filed on Apr. 9, 2020.

(30) Foreign Application Priority Data

Apr. 9, 2019 (CN) .......................... 201910281849.3

(51) Int. Cl.
*H04W 24/10* (2009.01)
*H04W 24/08* (2009.01)
(Continued)

(52) U.S. Cl.
CPC ........... *H04W 24/10* (2013.01); *H04W 24/08* (2013.01); *H04W 76/10* (2018.02); *H04W 76/27* (2018.02); *H04W 88/06* (2013.01)

(58) Field of Classification Search
CPC ..... H04W 24/10; H04W 76/27; H04W 76/10; H04W 24/08; H04W 88/06; H04W 76/15;
(Continued)

(56) References Cited

U.S. PATENT DOCUMENTS

2012/0230264 A1*  9/2012  Zhang ............. H04W 76/00
                                                370/329
2018/0110082 A1   4/2018  Saily et al.
(Continued)

FOREIGN PATENT DOCUMENTS

CN   102238618 A    11/2011
CN   105848098 A    8/2016
(Continued)

OTHER PUBLICATIONS

Examination Report, KR 10-2021-7036126, Oct. 29 (Year: 2024).*
Nokia, "Requirements for fast CA setup for euCA", 3GPP TSG-RAN WG4 Meeting #87, R4-1807541, Busan, Korea (republic of), May 21-25, 2018.
Qualcomm Inc., "Discussion on open issues in Idle mode Scell candidate measurement", 3GPP TSG-RAN WG4 Meeting #86bis, R4-1804423, Melbourne, Australia, Apr. 16-20, 2018.
(Continued)

*Primary Examiner* — Mandish K Randhawa
(74) *Attorney, Agent, or Firm* — Price Heneveld LLP

(57) ABSTRACT

Embodiments of the present disclosure provides a measurement method, measurement configuration method, terminal, and network device. The measurement method includes: receiving an advance measurement condition from a network device, where the advance measurement condition is determined based on state information related when a first object is started, and the first object includes at least one of carrier aggregation CA and dual connectivity DC; and triggering proactive measurement in a non-connected state if the advance measurement condition is met.

17 Claims, 4 Drawing Sheets

---

Receive an advance measurement condition from a network device — 301

Trigger proactive measurement in a non-connected state if the advance measurement condition is met — 302

(51) Int. Cl.
*H04W 76/10* (2018.01)
*H04W 76/27* (2018.01)
*H04W 88/06* (2009.01)

(58) Field of Classification Search
CPC ... H04L 5/0098; H04L 5/0023; H04L 5/0069; H04L 5/006; H04L 5/0032; H04L 5/001; H04L 5/0028; H04L 5/0048
See application file for complete search history.

(56) References Cited

U.S. PATENT DOCUMENTS

| | | |
|---|---|---|
| 2019/0037425 A1 | 1/2019 | Hong et al. |
| 2019/0174362 A1 | 6/2019 | Yang et al. |
| 2020/0029239 A1* | 1/2020 | Chen .................. H04W 76/19 |
| 2020/0146089 A1 | 5/2020 | Li et al. |
| 2022/0182868 A1* | 6/2022 | Rugeland .............. H04W 76/27 |

FOREIGN PATENT DOCUMENTS

| | | |
|---|---|---|
| CN | 107734574 A | 2/2018 |
| CN | 109309969 A | 2/2019 |
| CN | 109429360 A | 3/2019 |
| KR | 20190012096 A | 2/2019 |

OTHER PUBLICATIONS

ZTE Corporation, "Further consideration on early measurement reporting", 3GPP TSG-RAN WG2 Meeting#105bis, R2-1904248, Xi'an, China, Apr. 8-12, 2019.
Apple, "Early Measurement Report in NR", 3GPP TSG-RAN WG2 Meeting #105bis, R2-1903611, Xi'an, China, Apr. 8-12, 2019.
Qualcomm Inc., "Summary of email discussion [105#54] [NR/eCA-DC]: measurement configuration", 3GPP TSG-RAN WG2 Meeting#105bis, R2-1903237, Xi'an, China, Apr. 8-12, 2019.
Oppo, "Rules to store and perform early measurement", 3GPP TSG-RAN2#105bis, R2-1903085, Xian, China, Apr. 8-12, 2019.
Vivo, "Validity timer for early measurement", 3GPP TSG-RAN WG2 Meeting#101bis, R2-1804682, Sanya, China, Apr. 16-20, 2018.
Ericsson, Measurements for early setup of CA or DC, 3GPP TSG-RAN WG2#105 R2-1900694, Athens, Greece, Feb. 25-Mar. 1, 2019.
Huawei, HiSilicon, Fast SN addition and SCell activation via early measurement reporting, 3GPP TSG-RAN WG2 #105b R2-1905169, Xi'an, China, Apr. 8-12, 2019.

* cited by examiner

MEASUREMENT METHOD, MEASUREMENT CONFIGURATION METHOD, TERMINAL AND NETWORK DEVICE

CROSS-REFERENCE TO RELATED APPLICATIONS

This application is a continuation application of PCT Application No. PCT/CN2020/083964 filed on Apr. 9, 2020, which claims priority to Chinese Patent Application No. 201910281849.3 filed in China on Apr. 9, 2019, disclosures of which are incorporated herein by reference in their entireties.

TECHNICAL FIELD

The present disclosure relates to the field of communications technologies, and in particular, to a measurement method, measurement configuration method, terminal, and network device.

BACKGROUND

It is well known that, if a plurality of serving cells configured for a terminal (for example, User Equipment, UE) by a network belong to a same base station, it is referred to as carrier aggregation (CA). CA means that the terminal uses spectrum resources of a plurality of serving cells for data transmission at the same time, to improve a throughput of the terminal for receiving and sending data. A technology similar to CA includes dual connectivity (DC). If a plurality of serving cells configured for UE by the network belong to two base stations, it is referred to as DC.

CA for the terminal is configured by the network (NW). Usually, the network selects, based on a report result of measurement on an adjacent cell by the terminal, a cell whose signal quality meets a specific condition, and configures the cell as a serving cell of the terminal. Parameters of measurement on an adjacent cell by the terminal (such as a to-be-measured frequency and a measurement quantity, where the measurement quantity may include reference signal received power (RSRP) and/or reference signal received quality (RSRQ)) and reporting configurations (a reporting trigger condition, a to-be-reported measurement quantity, and the like) are configured by the network. Configuration and reporting for the measurement can be performed only after security activation. As a result, CA can be configured only after the terminal (for example, User Equipment, UE) experiences a relatively long delay.

To reduce the delay, an advance measurement technology is introduced in LTE: Based on a configuration made by a network (including a to-be-measured frequency, a measurement time length (Validity timer), and a measurement area (Validity area)), a terminal in a non-connected state measures the to-be-measured frequency in a configured time period and area; and the terminal reports a measurement result to the network when entering a connected state or after entering a connected state. This solution can effectively reduce a time delay between a time when the UE enters the connected state and a time when the UE can start to use CA for transmission. Specifically, a CA configuration procedure is shown in FIG. 1: A network device can send a configuration related to advance measurement, and the UE in the non-connected state can start the measurement only after receiving the configuration that is related to the advance measurement that includes the measurement time length. A DC configuration procedure is still in a discussion stage, and alternatively, can still use the CA configuration procedure.

Because service scenarios and network coverage of different terminals are different, controlling measurement behavior of the terminal by using the measurement time length cannot ensure that the terminal has an available measurement result to be provided for the network when entering the connected state, which is adverse to meeting a requirement for quickly activating CA and/or DC for the terminal by the network.

SUMMARY

According to a first aspect, some embodiments of the present disclosure provide a measurement method, applied to a terminal and including:

receiving an advance measurement condition from a network device, where the advance measurement condition is determined based on state information related when a first object is started, and the first object includes at least one of carrier aggregation CA and dual connectivity DC; and triggering proactive measurement in a non-connected state if the advance measurement condition is met.

According to a second aspect, some embodiments of the present disclosure further provide a measurement configuration method, applied to a network device and including:

sending an advance measurement condition to a terminal, where the advance measurement condition is determined based on state information related when a first object is started, and the first object includes at least one of carrier aggregation CA and dual connectivity DC; and the advance measurement condition is used to trigger the terminal to perform proactive measurement.

According to a third aspect, some embodiments of the present disclosure further provide a terminal, including:

a first receiving module, configured to receive an advance measurement condition from a network device, where the advance measurement condition is determined based on state information related when a first object is started, and the first object includes at least one of carrier aggregation CA and dual connectivity DC; and a control module, configured to trigger proactive measurement in a non-connected state if the advance measurement condition is met.

According to a fourth aspect, some embodiments of the present disclosure further provide a network device, including:

a first sending module, configured to send an advance measurement condition to a terminal, where the advance measurement condition is determined based on state information related when a first object is started, and the first object includes at least one of carrier aggregation CA and dual connectivity DC; and the advance measurement condition is used to trigger the terminal to perform proactive measurement.

According to a fifth aspect, some embodiments of the present disclosure further provide a terminal, including: a memory, a processor, and a program stored in the memory and executable on the processor. When the program is executed by the processor, the steps of the foregoing measurement method are implemented.

According to a sixth aspect, some embodiments of the present disclosure further provide a network device, including: a memory, a processor, and a program stored in the memory and executable on the processor. When the program is executed by the processor, the steps of the foregoing measurement configuration method are implemented.

According to a seventh aspect, some embodiments of the present disclosure further provide a computer-readable storage medium. The computer-readable storage medium stores a computer program. When the computer program is executed by a processor, the steps of the foregoing measurement method are implemented; or when the computer program is executed by a processor, the steps of the foregoing measurement configuration method are implemented.

DESCRIPTION OF EMBODIMENTS

The following clearly describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure shall fall within the protection scope of the present disclosure.

The term "include" and any of its other variants in the specification and claims of this application are intended to cover a non-exclusive inclusion, for example, a process, method, system, product, or device that includes a list of steps or units is not necessarily limited to those expressly listed steps or units, but may include other steps or units not expressly listed or inherent to such a process, method, product, or device. In addition, "and/or" used in the specification and claims means at least one of the connected objects. For example, A and/or B represents the following three cases: Only A exists, only B exists, and both A and B exist.

In the embodiments of the present disclosure, the term such as "exemplary" or "for example" is used to represent giving an example, an illustration, or a description. Any embodiment or design scheme described as "exemplary" or "for example" in the embodiments of this disclosure should not be construed as being more preferred or advantageous than other embodiments or design schemes. To be precise, the use of the term such as "exemplary" or "for example" is intended to present a related concept in a specific manner.

The following describes the embodiments of the present disclosure with reference to the accompanying drawings. A measurement method, measurement configuration method, terminal, and network device provided in the embodiments of the present disclosure can be applied to a wireless communications system. The wireless communications system may be a 5G system, an evolved long term evolution (eLTE) system, or a subsequent evolved communications system.

Figure 1:
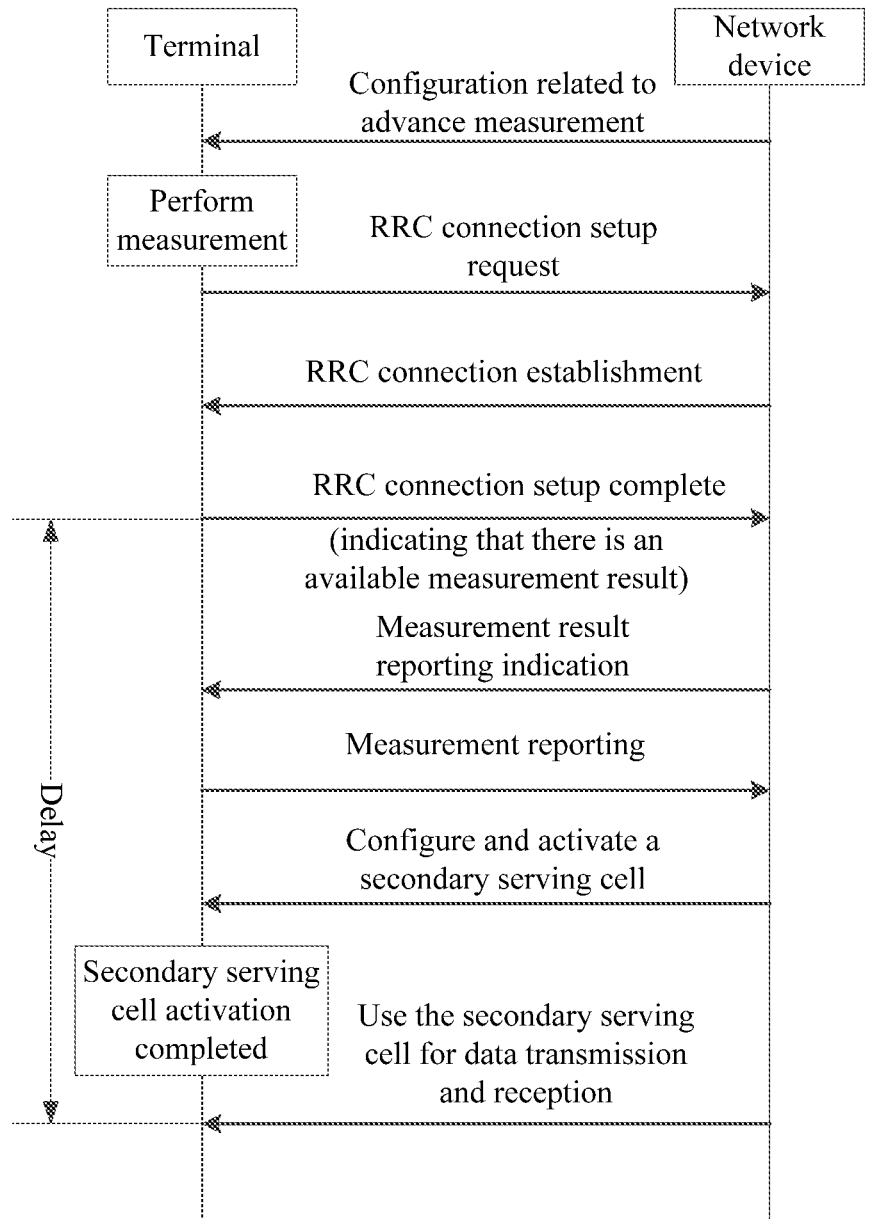
FIG. 1 is a conventional CA or DC configuration flowchart.
Figure 2:
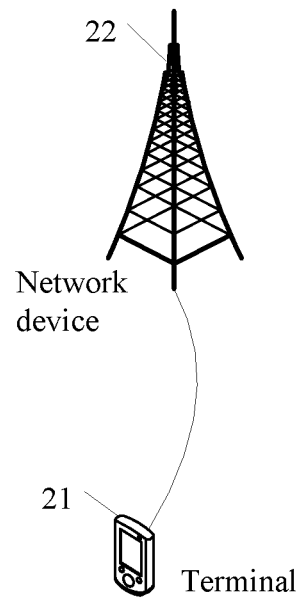
FIG. 2 is a structural diagram of a network system to which some embodiments of the present disclosure are applicable.

FIG. 2 is a structural diagram of a network system to which some embodiments of the present disclosure are applicable. As shown in FIG. 2, a terminal 21 and a network device 22 are included. The terminal 21 may be a user terminal, or another terminal side device, such as a mobile phone, a tablet personal computer, a laptop computer, a personal digital assistant (PDA), a mobile Internet device (MID), or a wearable device. It should be noted that a specific type of the terminal 21 is not limited in some embodiments of the present disclosure. The network device 22 may be a base station in 5G or a later release, or a base station in another communications system, or is referred to as a NodeB, an evolved NodeB, a transmission reception point (TRP), an access point (AP), or other terms in the field. The network device is not limited to specific technical terms, as long as a same technical effect is achieved. In addition, the network device 22 may be a master node (MN) or a secondary node (SN). It should be noted that in some embodiments of the present disclosure, the 5G base station is merely used as an example, but a specific type of the network device is not limited.

Figure 3:
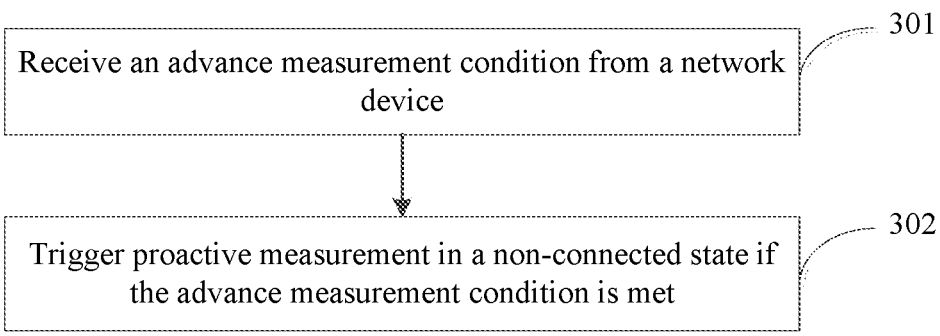
FIG. 3 is a flowchart of a measurement method according to some embodiments of the present disclosure.

FIG. 3 is a flowchart of a measurement method according to some embodiments of the present disclosure. The method is applied to a terminal, and as shown in FIG. 3, includes the following steps.

Step 301: Receive an advance measurement condition from a network device, where the advance measurement condition is determined based on state information related when a first object is started, and the first object includes at least one of carrier aggregation CA and dual connectivity DC.

In some embodiments of the present disclosure, the state information related when the first object is started is related information recorded for historical starting and usage of the first object for the terminal. Specifically, the terminal may report, to the network device, the state information related when the first object is started. The network device may configure the advance measurement condition for the terminal based on the state information related when the first object is started.

The advance measurement condition is received by the terminal before transition from a connected state to a non-connected state. In this embodiment, the terminal may receive, for a plurality of times, the advance measurement condition sent by the network device, and use a latest received advance measurement condition to perform proactive measurement. Specifically, the advance measurement condition may be carried in an RRC release message and/or a broadcast message.

The state information may include at least one of network coverage information, downlink channel quality, a geographic location, a serving cell, a serving frequency, a service attribute, power headroom information, buffer requirement information, a terminal type, and an antenna quantity.

The network coverage information may be reference signal received power (RSRP)/Reference Signal Received Quality (RSRQ) of the serving cell.

The downlink channel quality may be a channel quality indicator (CSI), a block error rate (BLER), and the like.

The service attribute may be at least one of a 5G QoS identifier (5QI) value, some dimensions of a 5QI, a guaranteed flow bit rate (GFBR), and a maximum flow bit rate (MFBR). Some dimensions of the 5QI include a resource type, a priority level, a packet delay budget, a packet error rate, an averaging window, and a maximum burst data volume (Maximum Data Burst Volume).

The power headroom information may be a power headroom report (PHR).

The buffer requirement information may be a buffer status report (BSR).

The terminal type may be a terminal category.

In an optional embodiment, the advance measurement condition may include at least one of a measurement threshold of a serving frequency, target downlink channel quality, a target geographic location, a target serving cell, a target service attribute, target power headroom, a target buffer requirement, a target terminal type, and a target antenna quantity.

Step 302: Trigger proactive measurement in a non-connected state if the advance measurement condition is met.

In a non-connected state, the terminal performs proactive measurement if the terminal meets the advance measurement condition. A specific measurement configuration for the proactive measurement may be configured by the network device, or may be pre-agreed upon by a protocol.

In some embodiments of the present disclosure, a wireless communications system in which the UE is located is an eLTE system, a 5G system, or a subsequent evolved communications system. In addition to two states, namely, an RRC CONNECTED state and an RRC IDLE state, the UE further has an RRC INACTIVE state. The RRC IDLE state and the RRC INACTIVE state are referred to as a non-connected state.

According to some embodiments of the present disclosure, the terminal is automatically triggered to perform proactive measurement based on the advance measurement condition determined based on the state information related when the first object is started. In this way, measurement behavior of the terminal is controlled by using the state information, thereby ensuring that when entering the connected state, the terminal has an available measurement result to be provided for a network. Therefore, controlling the measurement behavior of the terminal based on the advance measurement condition determined based on the state information in some embodiments of the present disclosure can better meet a requirement for quickly activating CA and/or DC for the terminal by a network.

Further, when the measurement configuration for the proactive measurement is configured by the network device, before the triggering proactive measurement, the method further includes:

receiving an advance measurement configuration from the network device, where the advance measurement configuration is used to indicate measurement content of the proactive measurement.

The advance measurement configuration includes at least one of a measurement frequency, a measurement bandwidth, measurement SSB based measurement timing configuration (SMTC), a measurement reference signal, a measurement target cell, and a measurement valid area. Specifically, the advance measurement configuration may be carried in an RRC release message and/or a broadcast message. The network device may send the advance measurement configuration and the advance measurement condition through a same message, or may send the advance measurement configuration and the advance measurement condition through different messages, which is not further limited herein.

In some embodiments of the present disclosure, the advance measurement configuration may be determined based on the state information related when the first object is started.

It should be understood that, in some embodiments of the present disclosure, when the network device configures the advance measurement condition and the advance measurement configuration for a first terminal, the configuration may be performed based on state information related when a first object corresponding to the first terminal is started, or may be performed based on state information related when a first object corresponding to at least one second terminal is started, or may be performed based on state information related when a first object corresponding to the first terminal and at least one second terminal is started.

In this embodiment, before receiving the advance measurement condition from the network device, the terminal may further report the state information to the network device. Specifically, before the receiving an advance measurement condition from a network device, the method further includes:

receiving configuration information from the network device, where the configuration information is used to indicate the terminal to start collecting statistics about the state information; and when the terminal reaches a counted quantity of times and/or time length, reporting a statistical result of the state information to the network device, where the statistical result is used to determine the advance measurement condition.

Specifically, the terminal has an artificial intelligence (AI) prediction function. The configuration information may be specifically understood as configuring the terminal to enable the AI prediction function. After the terminal receives the configuration information for enabling the AI prediction function, the terminal records the state information related when the network device activates the first object, and collects statistics about the state information. In some embodiments of the present disclosure, the terminal can be configured with reference to the AI prediction function so as to automatically start an advance measurement mechanism for specific network coverage and service scenarios, thereby better meeting a requirement for quickly activating CA and/or DC for the terminal by a network.

The foregoing counted quantity of times may be understood as a quantity of activations of the first object, and the foregoing counted time length may be understood as a time for continuous statistics collection after the statistics collection.

In an optional embodiment, the counted quantity of times and/or time length may be agreed upon by a protocol. In another optional embodiment, the counted quantity of times and/or time length may be configured by the network device. Specifically, when the network device configures the counted quantity of times and/or time length, the network device may configure the counted quantity of times or time length, or the network device may configure the counted quantity of times and time length. When the network device configures the counted quantity of times and time length, the terminal may report the statistical result when the terminal reaches the counted quantity of times, or report the statistical result when the terminal reaches the counted time length; and further, the terminal may report the statistical result when the terminal reaches both the counted quantity of times and time length. For specific implementation, a setting may be made according to an actual requirement, and no further limitation is imposed herein.

Further, in some embodiments of the present disclosure, the statistical result may include probability statistical information and/or prediction information.

The probability statistical information is used to determine probabilities of starting of the first object when state values of the state information are in different interval ranges. The prediction information includes N target interval ranges corresponding to N pieces of state information, probabilities of starting of the first object when the state values of the N pieces of state information are in the N target interval ranges are greater than a preset value, and N is a positive integer.

A quantity of the pieces of state information may be one or more, and two pieces of state information (downlink channel quality and power headroom information) are used as an example for detailed description. The downlink channel quality may include three cases: an A1 interval range (low channel quality), an A2 interval range (intermediate channel quality), and an A3 interval range (high channel quality). The power headroom information may include three cases: B1 (low power headroom), B2 (intermediate power headroom), and B3 (high power margin).

The probability statistical information can be expressed as: a quantity of times the first object has been started when the terminal is in a first interval range (the downlink channel quality is in the A1 interval and the power headroom information is in the B1 interval range); a quantity of times the first object has been started when the terminal is in a second interval range (the downlink channel is in the A1 interval range and the power headroom information is in the B2 interval range); a quantity of times the first object has been started when the terminal is in a third interval range (the downlink channel is in the A1 interval range and the power headroom information is in the B3 interval range); a quantity of times the first object has been started when the terminal is in a fourth interval range (the downlink channel is in the A2 interval range and the power headroom information is in the B1 interval range); a quantity of times the first object has been started when the terminal is in a fifth interval range (the downlink channel is in the A2 interval range and the power headroom information is in the B2 interval range); a quantity of times the first object has been started when the terminal is in a sixth interval range (the downlink channel is in the A2 interval range and the power headroom information is in the B3 interval range); a quantity of times the first object has been started when the terminal is in a seventh interval range (the downlink channel is in the A3 interval range and the power headroom information is in the B1 interval range); a quantity of times the first object has been started when the terminal is in an eighth interval range (the downlink channel is in the A3 interval range and the power headroom information is in the B2 interval range); and a quantity of times the first object has been started when the terminal is in a ninth interval range (the downlink channel is in the A3 interval range and the power headroom information is in the B3 interval range).

The foregoing N target interval ranges may specifically include a first target interval range of the downlink channel quality and a second target interval range of the power headroom information. For example, state values of the state information of the terminal are in any one of the fifth, sixth, eighth, and ninth interval ranges, and a probability of starting of the first object is greater than or equal to 70%. A probability of starting of the first object when the state values are in the remaining interval ranges is less than 70%. In this case, in an optional embodiment, the first target interval range may include the A2 interval range and the A3 interval range, and the second target interval range may include the B2 interval range and the B3 interval range.

It should be understood that a maximum value of the A2 interval range is less than or equal to a minimum value of the A3 interval range, and when a probability of starting of the first object corresponding to the A2 interval range is greater than a preset value, a probability of starting of the first object corresponding to the A3 interval range is greater than the preset value. Therefore, in another optional embodiment, the first target interval range may include only the A2 interval range. Similarly, the second target interval range may include only the B2 interval range.

It should be noted that the prediction information may be obtained through the AI prediction function of the terminal. Specifically, the receiving configuration information from the network device, the method may further include:

outputting the prediction information based on the probability statistical information and the artificial intelligence AI prediction function.

In this embodiment, when the terminal reaches the counted quantity of times and/or time length, the prediction information can be output through the artificial intelligence AI prediction function.

Further, after the triggering proactive measurement, the method further includes:

during transition from a non-connected state to a connected state, indicating, in a radio resource control RRC connection setup complete message or an RRC connection resume message, that the advance measurement has been started.

In this embodiment, when the terminal meets the foregoing advance measurement condition, that the advance measurement has been started may be indicated in a radio resource control RRC connection setup complete message or an RRC connection resume message during the transition from the non-connected state to the connected state.

To better understand the present disclosure, the following describes an implementation process of the present disclosure in detail.

Step 1: A network device configures UE to enable an AI prediction function, where the AI prediction function is used to record statistics about information (namely, the foregoing state information) related when the network device activates CA and/or DC configuration for UE. Specifically, the network device may configure the related information that needs to be measured, and the counted quantity of times and/or time length that need/needs to be measured.

The configured related information that needs to be measured includes at least one of the following:

network coverage when CA and/or DC are/is started, for example, RSRP/RSRQ of a serving cell;

downlink channel quality when CA and/or DC are/is started, for example, a channel quality indicator CSI and a block error rate BLER;

a geographic location when CA and/or DC are/is started;

a serving cell when CA and/or DC are/is started;

serving frequency when CA and/or DC are/is started a service attribute when CA and/or DC are/is started, for example, a 5QI value;

some dimensions of a 5QI, including a resource type, a priority level, a packet delay budget, a packet error rate, an averaging window, and a maximum data burst volume; a guaranteed stream bit rate; or maximum stream bit rate;

power headroom information when CA and/or DC are/is started, for example, a PHR;

buffer requirement information when CA and/or DC are/is started, for example, a BSR;

a UE type when CA and/or DC are/is started, for example, different UE categories; and an antenna quantity when CA and/or DC are/is started.

Step 2: After the UE meets the counted quantity of times and/or time length of step 1, report an "information statistical result" to the network device.

Specifically, the information statistical result may include probability statistical information, recorded by the UE, of starting of CA and/or DC, and/or prediction information output based on the probability statistical information in combination with the AI prediction function.

A manner of reporting the information statistical result may include:

during transition of the UE from a non-connected state to a connected state, indicating, in an RRC connection setup complete message or an RRC connection resume message, that there is an available information statistical result;

during transition of the UE from a non-connected state to a connected state, reporting the information statistical result in an RRC connection setup complete message or an RRC connection resume message;

when the UE is in a connected state, reporting the information statistical result upon a request from a network; or when the UE is in a connected state, directly reporting the information statistical result to a network.

Step 3: The network device configures an advance measurement configuration and an advance measurement condition for the UE based on the "information statistical result".

The advance measurement configuration includes at least one of a measurement frequency, a measurement bandwidth, measurement SSB based measurement timing configuration SMTC, a measurement reference signal, a measurement target cell, and a measurement valid area.

The advance measurement condition includes at least one of a measurement threshold of a serving frequency, target downlink channel quality, a target geographic location, a target serving cell, a target service attribute, target power headroom, a target buffer requirement, a target terminal type, and a target antenna quantity.

Specifically, the advance measurement configuration and the advance measurement condition are sent through an RRC release message and/or a broadcast message.

Step 4: When the UE meets the advance measurement condition, automatically start advance measurement based on the advance measurement configuration of the network device.

During transition of the UE from a non-connected state to a connected state, that the advance measurement has been started is indicated in a RRC connection setup complete message or an RRC connection resume message.

Figure 4:
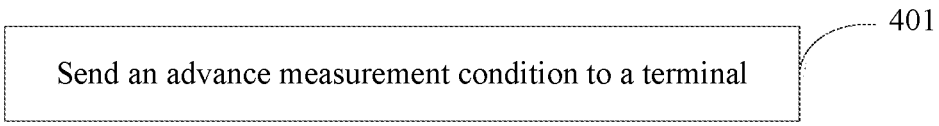
FIG. 4 is a flowchart of a measurement configuration method according to some embodiments of the present disclosure.

FIG. 4 is a flowchart of a measurement configuration method according to some embodiments of the present disclosure. The method is applied to a network device, and as shown in FIG. 4, includes the following step:

Step 401: Send an advance measurement condition to a terminal, where the advance measurement condition is determined based on state information related when a first object is started, and the first object includes at least one of carrier aggregation CA and dual connectivity DC; and the advance measurement condition is used to trigger the terminal to perform proactive measurement.

Optionally, the method further includes:

optionally, sending an advance measurement configuration to the terminal, where the advance measurement configuration is used to indicate measurement content of the proactive measurement.

Optionally, the advance measurement configuration includes at least one of a measurement frequency, a measurement bandwidth, measurement SSB based measurement timing configuration SMTC, a measurement reference signal, a measurement target cell, and a measurement valid area.

Optionally, the state information includes at least one of network coverage information, downlink channel quality, a geographic location, a serving cell, a service frequency, a service attribute, power headroom information, buffer requirement information, a terminal type, and an antenna quantity.

Optionally, before the sending an advance measurement condition to a terminal, the method further includes:

sending configuration information to a target terminal, where the configuration information is used to configure the target terminal to start collecting statistics about the state information;

when the target terminal reaches a counted quantity of times and/or time length, receiving a statistical result of the state information from the target terminal; and determining the advance measurement condition based on the statistical result.

Optionally, the counted quantity of times and/or time length are/is configured by the network device.

Optionally, the statistical result includes probability statistical information and/or prediction information.

The probability statistical information is used to determine probabilities of starting of the first object when state values of the state information are in different interval ranges. The prediction information includes N target interval ranges corresponding to N pieces of state information, probabilities of starting of the first object when the state values of the N pieces of state information are in the N target interval ranges are greater than a preset value, and N is a positive integer.

Optionally, the advance measurement condition includes at least one of a measurement threshold of a service frequency, target downlink channel quality, a target serving cell, a target geographic location, a target service attribute, target power headroom, a target buffer requirement, a target terminal type, and a target antenna quantity.

Optionally, after the sending an advance measurement condition to a terminal, the method further includes:

during transition of the terminal from a non-connected state to a connected state, receiving, from the terminal, an indication indicating that the advance measurement has been started, where the indication is carried in a radio resource control RRC connection setup complete message or an RRC connection resume message.

It should be noted that this embodiment serves as an embodiment of the network device corresponding to the embodiment shown in FIG. 3. For specific implementations of this embodiment, reference may be made to related description of the embodiment shown in FIG. 3, and a same effect can be achieved. In order to avoid repetition, details are not described herein again.

Figure 5:
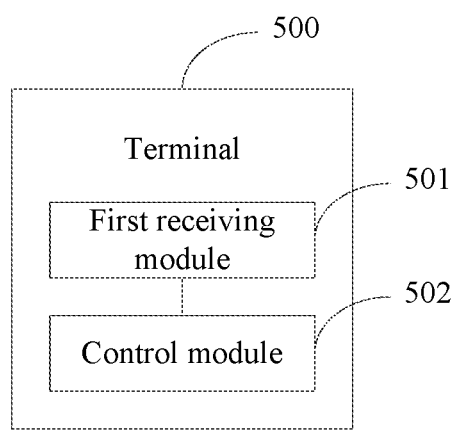
FIG. 5 is a structural diagram of a terminal according to some embodiments of the present disclosure.

FIG. 5 is a structural diagram of a terminal according to some embodiments of the present disclosure. As shown in FIG. 5, the terminal 500 includes:

a first receiving module 501, configured to receive an advance measurement condition from a network device, where the advance measurement condition is determined based on state information related when a first object is started, and the first object includes at least one of carrier aggregation CA and dual connectivity DC; and a control module 502, configured to trigger proactive measurement in a non-connected state if the advance measurement condition is met.

Optionally, the first receiving module 501 is further configured to receive an advance measurement configuration from the network device, where the advance measurement configuration is used to indicate measurement content of the proactive measurement.

Optionally, the advance measurement configuration includes at least one of a measurement frequency, a measurement bandwidth, measurement SSB based measurement timing configuration SMTC, a measurement reference signal, a measurement target cell, and a measurement valid area.

Optionally, the state information includes at least one of network coverage information, downlink channel quality, a geographic location, a serving cell, a service frequency, a service attribute, power headroom information, buffer requirement information, a terminal type, and an antenna quantity.

Optionally, the terminal 500 further includes:

a second receiving module, configured to receive configuration information from the network device, where the configuration information is used to indicate the terminal to start collecting statistics about the state information; and a reporting module, configured to: when the terminal 500 reaches a counted quantity of times and/or time length, report a statistical result of the state information to the network device, where the statistical result is used to determine the advance measurement condition.

Optionally, the counted quantity of times and/or time length are/is configured by the network device.

Optionally, the statistical result includes probability statistical information and/or prediction information.

The probability statistical information is used to determine probabilities of starting of the first object when state values of the state information are in different interval ranges. The prediction information includes N target interval ranges corresponding to N pieces of state information, probabilities of starting of the first object when the state values of the N pieces of state information are in the N target interval ranges are greater than a preset value, and N is a positive integer.

Optionally, the terminal 500 further includes:

a prediction module, configured to output the prediction information based on the probability statistical information and an artificial intelligence AI prediction function.

Optionally, the advance measurement condition includes at least one of a measurement threshold of a serving frequency, target downlink channel quality, a target geographic location, a target serving cell, a target service attribute, target power headroom, a target buffer requirement, a target terminal type, and a target antenna quantity.

Optionally, the terminal 500 further includes:

an indication module, configured to: during transition from a non-connected state to a connected state, indicate, in a radio resource control RRC connection setup complete message or an RRC connection resume message, that the advance measurement has been started.

The terminal provided in some embodiments of the present disclosure can implement processes implemented by the terminal in the method embodiment shown in FIG. 3 To avoid repetition, details are not described herein again.

Figure 6:
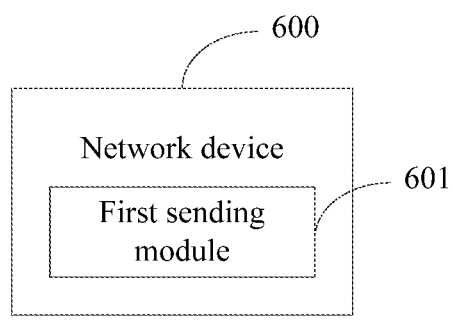
FIG. 6 is a structural diagram of a network device according to some embodiments of the present disclosure.

FIG. 6 is a structural diagram of a network device according to some embodiments of the present disclosure. As shown in FIG. 6, the network device 600 includes:

a first sending module 601, configured to send an advance measurement condition to a terminal, where the advance measurement condition is determined based on state information related when a first object is started, and the first object includes at least one of carrier aggregation CA and dual connectivity DC; and the advance measurement condition is used to trigger the terminal to perform proactive measurement.

Optionally, the first sending module 601 is further configured to send an advance measurement configuration to the terminal, where the advance measurement configuration is used to indicate measurement content of the proactive measurement.

Optionally, the advance measurement configuration includes at least one of a measurement frequency, a measurement bandwidth, measurement SSB based measurement timing configuration SMTC, a measurement reference signal, a measurement target cell, and a measurement valid area.

Optionally, the state information includes at least one of network coverage information, downlink channel quality, a geographic location, a serving cell, a service frequency, a service attribute, power headroom information, buffer requirement information, a terminal type, and an antenna quantity.

Optionally, the network device 600 further includes:

a second sending module, configured to send configuration information to a target terminal, where the configuration information is used to configure the target terminal to start collecting statistics about the state information;

a third receiving module, configured to: when the target terminal reaches a counted quantity of times and/or time length, receive a statistical result of the state information from the target terminal; and a determining module, configured to determine the advance measurement condition based on the statistical result.

Optionally, the counted quantity of times and/or time length are/is configured by the network device.

Optionally, the statistical result includes probability statistical information and/or prediction information.

The probability statistical information is used to determine probabilities of starting of the first object when state values of the state information are in different interval ranges. The prediction information includes N target interval ranges corresponding to N pieces of state information, probabilities of starting of the first object when the state values of the N pieces of state information are in the N target interval ranges are greater than a preset value, and N is a positive integer.

Optionally, the advance measurement condition includes at least one of a measurement threshold of a service frequency, target downlink channel quality, a target serving cell, a target geographic location, a target service attribute, target power headroom, a target buffer requirement, a target terminal type, and a target antenna quantity.

Optionally, the network device further includes:

a fourth receiving module, configured to: during transition of the terminal from a non-connected state to a connected state, receive, from the terminal, an indication indicating that the advance measurement has been started, where the indication is carried in a radio resource control RRC connection setup complete message or an RRC connection resume message.

The network device provided in some embodiments of the present disclosure can implement processes implemented by the network device in the method embodiment shown in FIG. 4. To avoid repetition, details are not described herein again.

Figure 7:
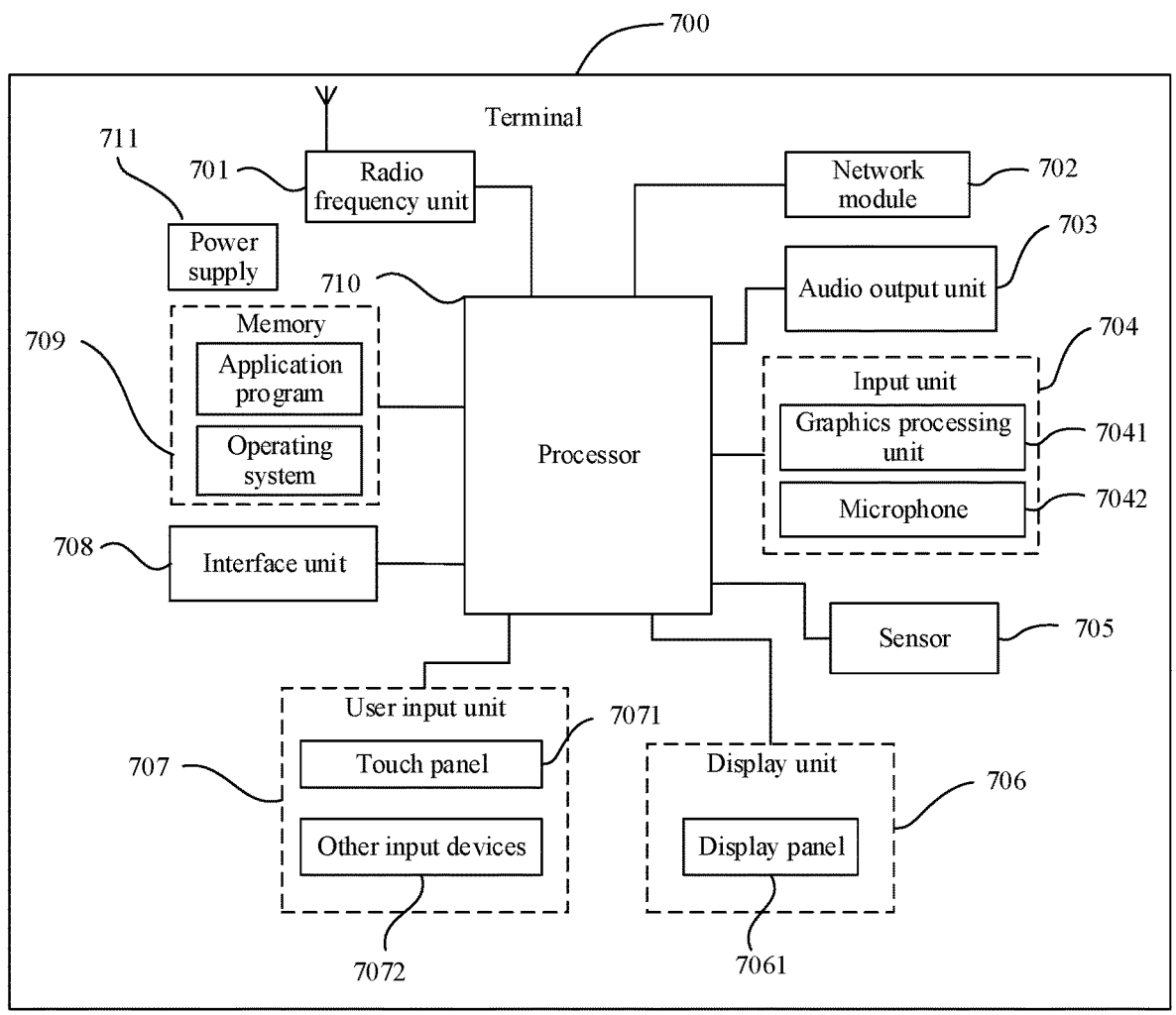
FIG. 7 is another structural diagram of a terminal according to some embodiments of the present disclosure.

FIG. 7 is a schematic diagram of a hardware structure of a terminal for implementing embodiments of the present disclosure.

The terminal 700 includes but is not limited to: a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the terminal structure shown in FIG. 7 does not constitute a limitation on the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, an in-vehicle terminal, a wearable device, a pedometer, and the like.

The radio frequency unit 701 is configured to receive an advance measurement condition configured from a network device, where the advance measurement condition is determined based on state information related when a first object is started, and the first object includes at least one of carrier aggregation CA and dual connectivity DC.

The processor 705 is configured to trigger proactive measurement in a non-connected state if the advance measurement condition is met.

According to some embodiments of the present disclosure, the terminal is automatically triggered to perform proactive measurement based on the advance measurement condition determined based on the state information related when the first object is started. In this way, measurement behavior of the terminal is controlled by using the state information, thereby ensuring that when entering the connected state, the terminal has an available measurement result to be provided for a network. Therefore, controlling the measurement behavior of the terminal based on the advance measurement condition determined based on the state information in some embodiments of the present disclosure can better meet a requirement for quickly activating CA and/or DC for the terminal by a network.

It should be understood that, in some embodiments of the present disclosure, the radio frequency unit 701 may be configured to receive and transmit information, or receive and transmit a signal during a call. Specifically, the radio frequency unit 701 receives downlink data from a base station, and then transmits the downlink data to the processor 710 for processing; and in addition, transmits uplink data to the base station. Generally, the radio frequency unit 701 includes but is not limited to, an antenna, at least one amplifier, a transceiver, a coupler, a low noise amplifier, a duplexer, and the like. In addition, the radio frequency unit 701 further may communicate with a network and another device through a wireless communications system.

The terminal provides a user with wireless broadband internet access by using the network module 702, for example, helping the user receive and send an email, browse a web page, and access streaming media.

The audio output unit 703 may convert audio data received by the radio frequency unit 701 or the network module 702 or stored in the memory 709 into an audio signal and output the audio signal as a sound. In addition, the audio output unit 703 may further provide an audio output (for example, a call signal received sound, or a message received sound) related to a specific function implemented by the terminal 700. The audio output unit 703 includes a loudspeaker, a buzzer, a receiver, and the like.

The input unit 704 is configured to receive an audio or video signal. The input unit 704 may include a graphics processing unit (GPU) 7041 and a microphone 7042. The graphics processing unit 7041 processes image data of a static image or video obtained by an image capture apparatus (such as a camera) in a video capture mode or an image capture mode. A processed image frame may be displayed on the display unit 706. The image frame processed by the graphics processing unit 7041 may be stored in the memory 709 (or another storage medium) or sent by using the radio frequency unit 701 or the network module 702. The microphone 7042 can receive a sound, and can process such a sound to obtain audio data. Processed audio data may be converted, in a telephone call mode, into a format that can be sent to a mobile communication base station via the radio frequency unit 701 for output.

The terminal 700 further includes at least one type of sensor 705, such as a light sensor, a motion sensor, and another sensor. Specifically, the light sensor includes an ambient light sensor and a proximity sensor. The ambient light sensor may adjust luminance of the display panel 7061 based on brightness of ambient light, and the proximity sensor may turn off the display panel 7061 and/or backlight when the terminal 700 approaches an ear. As a type of motion sensor, an accelerometer sensor may detect values of accelerations in various directions (generally three axes), and may detect a value and a direction of gravity when the terminal stays still. The accelerometer sensor may be configured to recognize a terminal posture (for example, landscape/portrait screen switching, a related game, or magnetometer posture calibration), performs a vibration recognition related function (for example, a pedometer or a strike), and so on. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information entered by the user or information provided for the user. The display unit 706 may include a display panel 7061, and the display panel 7061 may be configured in a form of a liquid crystal display (LCD), an organic light-emitting diode (OLED), or the like.

The user input unit 707 may be configured to receive input digit or character information and generate key signal input related to user settings and function control of the terminal. Specifically, the user input unit 707 includes a touch panel 7071 and other input devices 7072. The touch panel 7071, also referred to as a touchscreen, can collect a touch operation performed by a user on or near the touch panel 7071 (such as an operation on or near the touch panel 7071 performed by a user by using any suitable object or accessory such as a finger or a stylus). The touch panel 7071 may include two parts: a touch detection apparatus and a touch controller. The touch detection apparatus detects a touch direction and position of the user, detects a signal brought by the touch operation, and transmits the signal to the touch controller. The touch controller receives touch information from the touch detection apparatus, converts the touch information into touch point coordinates, and sends the touch point coordinates to the processor 710; and receives and executes a command sent by the processor 710. In addition, the touch panel 7071 may be implemented as a resistive type, a capacitive type, an infrared type, a surface acoustic wave type, or the like. In addition to the touch panel 7071, the user input unit 707 may further include other input devices 7072. Specifically, the another input device 7072 may include but is not limited to a physical keyboard, a function button (such as a volume control button or a power on/off button), a trackball, a mouse, a joystick, and the like. Details are not described herein.

Further, the touch panel 7071 can cover the display panel 7061. When detecting a touch operation on or near the touch panel 7071, the touch panel 7071 transmits the touch operation to the processor 710 to determine a type of a touch event. Then, the processor 710 provides corresponding visual output on the display panel 7061 based on the type of the touch event. Although the touch panel 7071 and the display panel 7061 are used as two separate components to implement input and output functions of the terminal in FIG. 7, in some embodiments, the touch panel 7071 and the display panel 7061 may be integrated to implement the input and output functions of the terminal. This is not specifically limited herein.

The interface unit 708 is an interface connecting an external apparatus to the terminal 700. For example, the interface unit 708 may include a wired or wireless headphone port, an external power supply (or a battery charger) port, a wired or wireless data port, a storage card port, a port used to connect to an apparatus having an identity module, an audio input/output (I/O) port, a video I/O port, a headset jack, and the like. The interface unit 708 may be configured to receive an input (such as data information or electric power) from the external apparatus and transmit the received input to one or more elements of the terminal 700, or may be configured to transmit data between the terminal 700 and the external apparatus.

The memory 709 may be configured to store a software program as well as various data. The memory 709 may mainly include a program storage area and a data storage area. The program storage area may store an operating system, an application program (for example, a sound play function or an image play function) required for at least one function, and the like. The data storage area may store data created based on use of the mobile phone (for example, audio data and a phone book), and the like. In addition, the memory 709 may include a high-speed random access memory, and may further include a nonvolatile memory, for example, at least one disk storage device, a flash memory, or another nonvolatile solid-state storage device.

The processor 710 is a control center of the terminal, and is connected to all parts of the entire terminal by using various interfaces and lines, and performs various functions of the terminal and processes data by running or executing the software program and/or a module that are stored in the memory 709 and invoking the data stored in the memory 709, to implement overall monitoring on the terminal. The processor 710 may include one or more processing units. Optionally, the processor 710 may be integrated with an application processor and a modem processor. The application processor mainly processes an operating system, a user interface, an application program, and the like. The modem processor mainly processes wireless communications. It should be understood that the modem processor may be not integrated in the processor 710.

The terminal 700 may further include a power supply 711 (for example, a battery) that supplies power to each component. Optionally, the power supply 711 may be logically connected to the processor 710 by using a power management system, to implement functions such as charging, discharging, and power consumption management by using the power management system.

In addition, the terminal 700 includes some function modules not shown, and details are not described herein.

Optionally, some embodiments of the present disclosure further provide a terminal, including a processor 710, a memory 709, and a program stored in the memory 709 and executable on the processor 710. When the program is executed by the processor 710, processes of the foregoing measurement method embodiment are implemented, and a same technical effect can be achieved. To avoid repetition, details are not described herein again.

Figure 8:
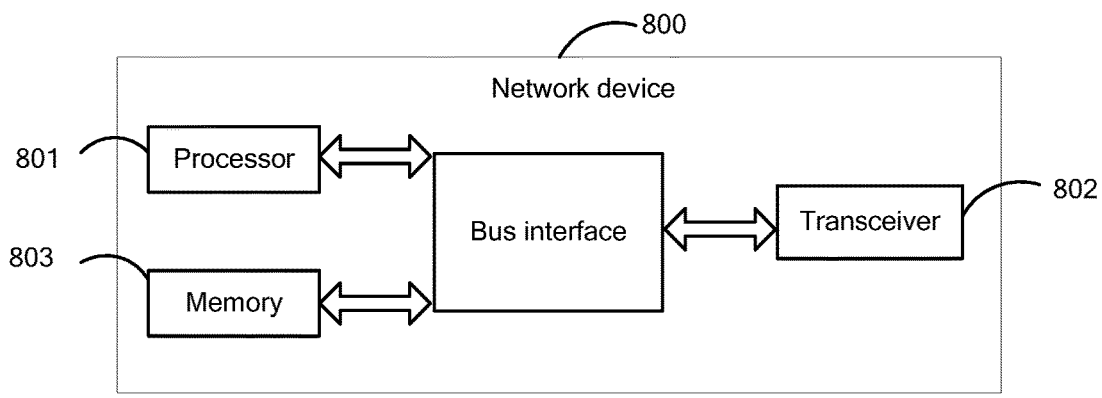
FIG. 8 is another structural diagram of a network device according to some embodiments of the present disclosure.

FIG. 8 is a structural diagram of another network device according to some embodiments of the present disclosure. As shown in FIG. 8, the network device 800 includes a processor 801, a transceiver 802, a memory 803, and a bus interface.

The transceiver 802 is configured to send an advance measurement condition to a terminal, where the advance measurement condition is determined based on state information related when a first object is started, and the first object includes at least one of carrier aggregation CA and dual connectivity DC; and the advance measurement condition is used to trigger the terminal to perform proactive measurement.

According to some embodiments of the present disclosure, the terminal is automatically triggered to perform proactive measurement based on the advance measurement condition determined based on the state information related when the first object is started. In this way, measurement behavior of the terminal is controlled by using the state information, thereby ensuring that when entering the connected state, the terminal has an available measurement result to be provided for a network. Therefore, controlling the measurement behavior of the terminal based on the advance measurement condition determined based on the state information in some embodiments of the present disclosure can better meet a requirement for quickly activating CA and/or DC for the terminal by a network.

In FIG. 8, a bus architecture may include any quantity of interconnected buses and bridges, which are specifically connected together by various circuits of one or more processors represented by the processor 801 and a memory represented by the memory 803. The bus architecture may further connect various other circuits such as peripheral devices, voltage regulators, and power management circuits, which are all known in the art, and therefore, no further description is given herein. The bus interface provides an interface. The transceiver 802 may be a plurality of elements, including a transmitter and a receiver, and provides a unit for communicating on a transmission medium with various other devices. For different user equipment, the interface may also be an interface capable of connecting externally and internally to a required device. The connected device includes but is not limited to a keypad, a display, a speaker, a microphone, a joystick, and the like.

The processor 801 is responsible for managing the bus architecture and common processing, and the memory 803 may store data used when the processor 801 performs an operation.

Optionally, some embodiments of the present disclosure further provide a network device, including a processor 801, a memory 803, and a program stored in the memory 803 and executable on the processor 801. When the program is executed by the processor 801, processes of the foregoing measurement configuration method embodiment are implemented, and a same technical effect can be achieved. To avoid repetition, details are not described herein again.

Some embodiments of the present disclosure further provide a computer-readable storage medium. The computer-readable storage medium stores a computer program. When the computer program is executed by a processor, processes of the measurement configuration method embodiment on the network device side provided in some embodiments of the present disclosure are implemented, or when the computer program is executed by a processor, processes of the measurement method embodiment on the terminal side provided in some embodiments of the present disclosure are implemented, and a same technical effect can be achieved. To avoid repetition, details are not described herein again. The computer-readable storage medium is, for example, a read-only memory (ROM), a random access memory (RAM), a magnetic disk, or an optical disc.

It may be understood that the embodiments described in the embodiments of the present disclosure may be implemented by hardware, software, firmware, middleware, microcode, or a combination thereof. For hardware implementation, a module, unit, submodule, subunit, and the like can be implemented in one or more application-specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, other electronic units used to perform the functions described in this disclosure, or a combination thereof.

For software implementation, technologies described in the embodiments of the present disclosure may be implemented through modules (for example, procedures or functions) that implement the functions in the embodiments of the present disclosure. Software code may be stored in a memory and executed by a processor. The memory may be implemented in the processor or outside the processor.

Therefore, the objectives of the present disclosure may also be achieved by running a program or a group of programs on any computing apparatus. The computing apparatus may be a well-known general-purpose apparatus. Therefore, the objectives of the present disclosure can also be achieved merely by providing a program product including program code for implementing the method or apparatus. In other words, such a program product also constitutes the present disclosure, and a storage medium storing such a program product also constitutes the present disclosure. Obviously, the storage medium may be any well-known storage medium or any storage medium to be developed in the future. It should also be pointed out that, in the apparatus and method of the present disclosure, obviously, various components or steps can be split and/or recombined. These splittings and/or recombinations shall be considered as equivalent solutions of the present disclosure. In addition, the steps of performing the foregoing series of processing can naturally be performed in time order as described, but do not necessarily need to be performed in time order. Some steps may be performed in parallel or independently of each other.

It should be noted that in this specification, the terms "comprise", "include", and any other variants thereof are intended to cover non-exclusive inclusion, so that a process, a method, an article, or an apparatus that includes a series of elements not only includes these elements, but also includes other elements not expressly listed, or further includes elements inherent to this process, method, article, or apparatus. An element limited by "includes a . . . ", without more constraints, does not preclude the presence of additional identical elements in the process, method, article, or apparatus that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes instructions for enabling a terminal (which may be a mobile phone, a computer, a server, an air conditioner, a base station, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely illustrative but not restrictive. Under enlightenment of the present disclosure, a person of ordinary skill in the art may make many forms without departing from the principles of the present disclosure and the protection scope of the claims, all of which fall within the protection of the present disclosure.

What is claimed is:

1. A measurement method, performed by a terminal and comprising:

receiving an advance measurement condition from a network device; and triggering proactive measurement in a non-connected state in response to the advance measurement condition being met;

wherein the advance measurement condition is determined by the network device based on state information, and the state information is obtained by the terminal when a first object is started, and the first object comprises at least one of carrier aggregation (CA) and dual connectivity (DC);

wherein the state information comprises at least one of network coverage information, downlink channel quality, a geographic location, a serving frequency, a service attribute, power headroom information, buffer requirement information, a terminal type, and an antenna quantity;

wherein before the receiving an advance measurement condition from a network device, the method further comprises:

receiving configuration information from the network device, wherein the configuration information is used to indicate the terminal to start collecting statistics about the state information; and when the terminal reaches a counted quantity of times and/or time length, reporting a statistical result of the state information to the network device, wherein the statistical result is used to determine the advance measurement condition;

wherein the statistical result comprises probability statistical information and/or prediction information; and the probability statistical information is used to determine probabilities of starting of the first object when state values of the state information are in different interval ranges; and the prediction information comprises N target interval ranges corresponding to N pieces of state information, probabilities of starting of the first object when the state values of the N pieces of state information are in the N target interval ranges are greater than a preset value, and N is a positive integer.

2. The method according to claim 1, wherein before the triggering proactive measurement, the method further comprises:
receiving an advance measurement configuration from the network device, wherein the advance measurement configuration is used to indicate measurement content of the proactive measurement.

3. The method according to claim 2, wherein the advance measurement configuration comprises at least one of a measurement frequency, a measurement bandwidth, measurement SSB based measurement timing configuration (SMTC), a measurement reference signal, a measurement target cell, and a measurement valid area.

4. The method according to claim 1, wherein the advance measurement condition comprises at least one of a measurement threshold of a serving frequency, target downlink channel quality, a target geographic location, a target serving cell, a target service attribute, target power headroom, a target buffer requirement, a target terminal type, and a target antenna quantity;
and/or,
wherein the non-connected state is an idle state or an inactive state.

5. The method according to claim 1, wherein the counted quantity of times and/or time length are/is configured by the network device.

6. The method according to claim 1,
wherein after the receiving configuration information from the network device, the method further comprises:
outputting the prediction information based on the probability statistical information and an artificial intelligence (AI) prediction function.

7. A non-transitory computer-readable storage medium, wherein the non-transitory computer-readable storage medium stores a computer program, wherein when the computer program is executed by a processor, the steps of the measurement method according to claim 1 are implemented.

8. The method according to claim 1, wherein after the triggering proactive measurement, the method further comprises:
during transition from a non-connected state to a connected state, indicating, in a radio resource control (RRC) connection setup complete message or an RRC connection resume message, that the advance measurement has been started.

9. A measurement configuration method, performed by a network device and comprising:
sending an advance measurement condition to a terminal, wherein the advance measurement condition is determined by the network device based on state information, and the state information is obtained by the terminal when a first object is started, and the first object comprises at least one of carrier aggregation (CA) and dual connectivity (DC); and the terminal is triggered to perform proactive measurement in response to the advance measurement condition being met;
wherein the state information comprises at least one of network coverage information, downlink channel quality, a geographic location, a serving frequency, a service attribute, power headroom information, buffer requirement information, a terminal type, and an antenna quantity;
wherein before the sending an advance measurement condition to a terminal, the method further comprises:
sending configuration information to a target terminal, wherein the configuration information is used to configure the target terminal to start collecting statistics about the state information;
when the target terminal reaches a counted quantity of times and/or time length, receiving a statistical result of the state information from the target terminal; and
determining the advance measurement condition based on the statistical result;
wherein the statistical result comprises probability statistical information and/or prediction information; and
the probability statistical information is used to determine probabilities of starting of the first object when state values of the state information are in different interval ranges; and the prediction information comprises N target interval ranges corresponding to N pieces of state information, probabilities of starting of the first object when the state values of the N pieces of state information are in the N target interval ranges are greater than a preset value, and N is a positive integer.

10. The method according to claim 9, comprising
sending an advance measurement configuration to the terminal, wherein the advance measurement configuration is used to indicate measurement content of the proactive measurement.

11. The method according to claim 10, wherein the advance measurement configuration comprises at least one of a measurement frequency, a measurement bandwidth, measurement SSB based measurement timing configuration (SMTC), a measurement reference signal, a measurement target cell, and a measurement valid area.

12. The method according to claim 9, wherein the counted quantity of times and/or the time length are/is configured by the network device.

13. The method according to claim 9, wherein the advance measurement condition comprises at least one of a measurement threshold of a serving frequency, target downlink channel quality, a target serving cell, a target geographic location, a target service attribute, target power headroom, a target buffer requirement, a target terminal type, and a target antenna quantity.

14. A network device, comprising: a memory, a processor, and a program stored in the memory and executable on the processor, wherein when the program is executed by the processor, the steps of the measurement configuration method according to claim 9 are implemented.

15. A non-transitory computer-readable storage medium, wherein the non-transitory computer-readable storage medium stores a computer program, wherein when the computer program is executed by a processor, the steps of the measurement configuration method according to claim 9 are implemented.

16. The method according to claim 9, wherein after the sending an advance measurement condition to a terminal, the method further comprises:
during transition of the terminal from a non-connected state to a connected state, receiving, from the terminal, an indication indicating that the advance measurement has been started, wherein the indication is carried in a radio resource control (RRC) connection setup complete message or an RRC connection resume message.

17. A terminal, comprising a memory, a processor, and a program stored in the memory and executable on the processor, wherein when the program is executed by the processor, a measurement method is implemented, and the method comprises:

receiving an advance measurement condition from a network device; and triggering proactive measurement in a non-connected state in response to the advance measurement condition being met;

wherein the advance measurement condition is determined by the network device based on state information, and the state information is obtained by the terminal when a first object is started, and the first object comprises at least one of carrier aggregation (CA) and dual connectivity (DC);

wherein the state information comprises at least one of network coverage information, downlink channel quality, a geographic location, a serving frequency, a service attribute, power headroom information, buffer requirement information, a terminal type, and an antenna quantity;

wherein before the receiving an advance measurement condition from a network device, the method further comprises:

receiving configuration information from the network device, wherein the configuration information is used to indicate the terminal to start collecting statistics about the state information; and when the terminal reaches a counted quantity of times and/or time length, reporting a statistical result of the state information to the network device, wherein the statistical result is used to determine the advance measurement condition;

wherein the statistical result comprises probability statistical information and/or prediction information; and the probability statistical information is used to determine probabilities of starting of the first object when state values of the state information are in different interval ranges; and the prediction information comprises N target interval ranges corresponding to N pieces of state information, probabilities of starting of the first object when the state values of the N pieces of state information are in the N target interval ranges are greater than a preset value, and N is a positive integer.

\* \* \* \* \*